June 27, 1939. P. HALLOT 2,163,731
AUTOMATIC REGULATING DEVICE FOR BRAKES
Filed March 1, 1937
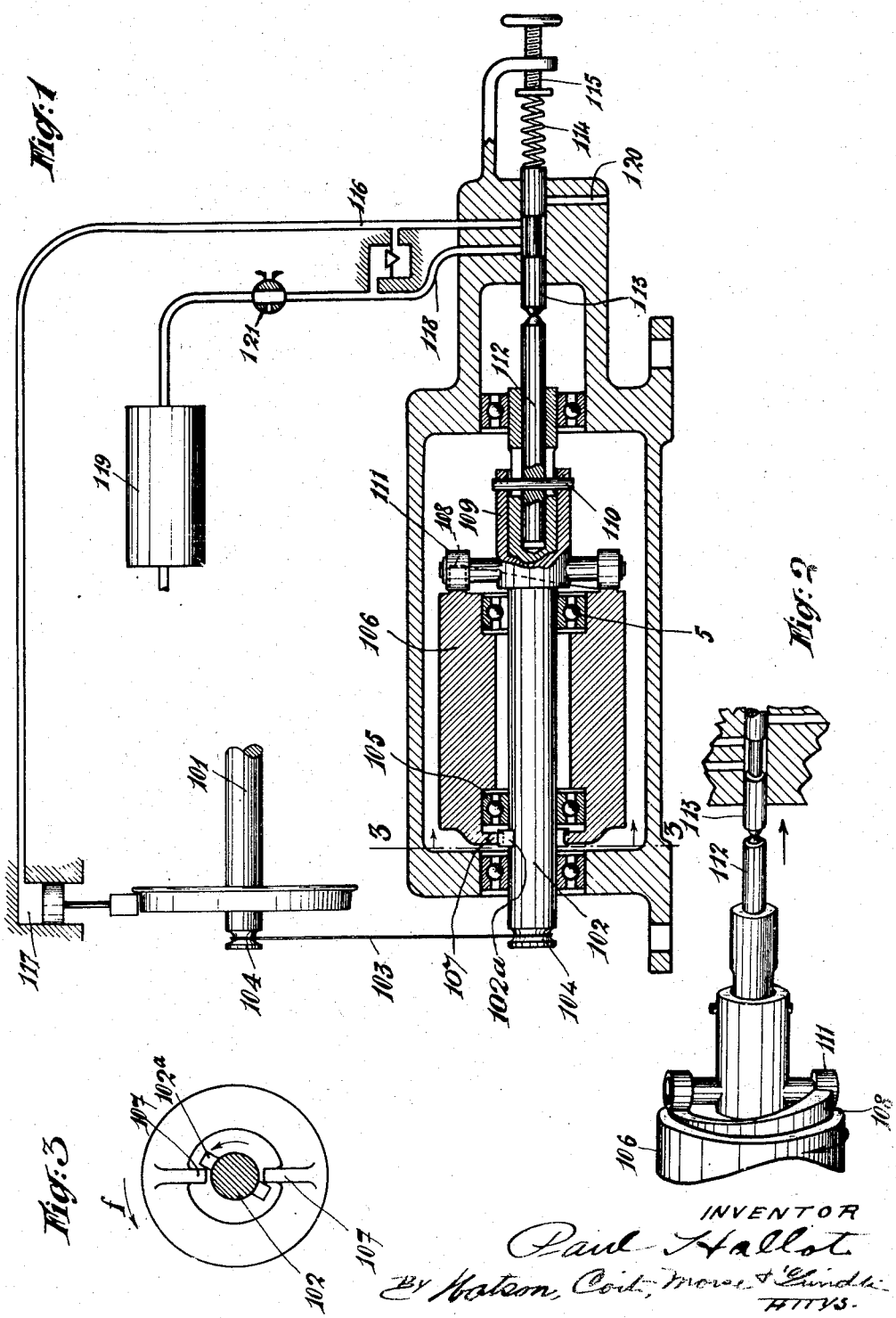
INVENTOR
Paul Hallot
By Watson, Coit, Morse & Lindle
ATTYS.

Patented June 27, 1939

2,163,731

UNITED STATES PATENT OFFICE 2,163,731

AUTOMATIC REGULATING DEVICE FOR BRAKES

Paul Hallot, Paris, France

Application March 1, 1937, Serial No. 128,530
In France March 6, 1936

3 Claims. (Cl. 188—181)

The present invention relates to automatic regulating devices for railway vehicles.

The chief object of the present invention is to provide a regulating device of this kind which is simple, easy to fit, and capable of permitting various adjustments.

According to the present invention, the device includes a rotating mass of high inertia, which is made of a suitable density and volume; said mass is driven by the wheels, for instance through the medium of abutments, and it is capable of moving angularly with respect to the driving part only in the case of the negative acceleration of the wheels becoming too high, then producing, by its rotation, an axial thrust upon the regulating or distributing device of the brake, for instance through the intermediate of inclined surfaces acting upon rollers or equivalent members, whatever be the direction of working that is considered.

This mass may be constituted by a cylinder which is mounted loose upon a shaft connected to the wheels. This shaft is provided with stops or abutments for driving the cylinder, and the latter is provided with a helical inclined surface upon which bear rollers carried by a movable element which is capable of operating the brake regulating means. Said movable element is further subjected to the action of the antagonistic resilient means, such for instance as a spring or a piston compressing a fluid, which oppose the displacements of said element under the effect of angular displacements of said cylinder as above explained.

These antagonistic resilient means are adjustable so as to permit of taking into account variable conditions of working of the system, such for instance as the load acting upon the vehicle axle.

A preferred embodiment of the present invention will be hereinafter described, with reference to the accompanying drawing, given merely by way of example, and in which:

Fig. 1 is a diagrammatical view, partly in section, of an embodiment of the self-regulating device according to the invention;

Fig. 2 is a perspective detail view corresponding to Fig. 1;

Fig. 3 shows, in one of the directions of working, the abutments for driving the inert mass, shown in projection on a plane at right angles to the shaft driven by the wheels.

In the embodiment shown by the drawing, one of axles, 101, of the vehicle which is to be braked, drives a shaft 102, through a suitable transmission, for instance belt 103 and pulleys 104, automatically engaged merely at the time of braking.

On this shaft 102, a cylinder 106 having a sufficient inertia with respect to its axis is mounted by means of roller bearings 105 so as to be free to turn about said shaft 102. This cylinder 106 is provided, as shown by Fig. 3, with abutments 107 which serves to its drive by shaft 102 but however permit it to turn through a certain angle about said shaft. It is further provided, at one of its ends, with helical inclined edges 108, each having the same angular length as the angle of freedom of said cylinder, about shaft 102. A sleeve 109, slidable on the end of said shaft, but adapted to rotate together with said shaft owing to the provision of key 110, carries rollers 111 which bear upon helical edge 108. Through key 110, this sleeve 109 is rigid with a push piece 112 which bears upon the end of a slide valve 113 itself subjected to the action of a suitable antagonistic force, for instance that of a spring 114, the strength of which can be adjusted by means of a screw abutment 115, or that of a compression piston or any other equivalent device. The action of these antagonistic means can be adjusted either from the outside of the car or through any known automatic means, working as a function of the variable load of the axles as diagrammatically shown by Fig. 10 of the French addition Patent 33,522 of June 30, 1934, or through any other equivalent means.

This slide valve 113 controls conduit 116 leading to the brake cylinder 117, conduit 118 leading from the compressed air reservoir 119, and finally the exhaust nozzle 120 opening into the atmosphere.

The operation of this device is the following:

When the wheels turn, for instance at a constant speed, the abutments 102a of shaft 102 impart to cylinder 106 a speed of revolution proportional to that of the wheels and which depends upon the ratio of transmission 103. This corresponds to a determined relative position of cylinder 106 and shaft 102, and, in this position, the rollers 111 of sleeve 109 are at the origin of the helical inclined edges 108, as shown by Fig. 2. Slide valve 113 then establishes the connections shown by Fig. 1, that is to say the compressed air reservoir 119 can be set in communication with the brake cylinder 117 through the engineer's valve 121.

If the engineer applies the brake, the wheels take a certain negative acceleration. Owing to its inertia, cylinder 106 tends to keep its speed and to move, with respect to shaft 102 in the direction of arrow f (Fig. 3). In the course of this displacement, the sleeve tends to move rollers 111 toward the right hand side of the figure, through the action of helical inclined edges 108 and therefore to move slide valve 113 while compressing the spring 114.

If the negative acceleration of the wheels is not sufficient for permitting the axial thrust on the rollers due to the inertia effort to exceed the value of the effort of spring 114 (or any other antagonistic element, such for instance as a piston) there will be no angular displacement of cylinder 106 with respect to shaft 102, but if the negative acceleration becomes too great (case of skidding of the wheels) the angular displacement will take place and slide valve 113, moved toward the right hand side of the figure, will bring the brake cylinder in communication with the atmosphere. The braking action will decrease until the negative acceleration is reduced to the value that corresponds to the variable compression imparted to spring 114 or any other equivalent antagonistic element.

In a general manner, while I have, in the above description, disclosed what I deem to be a practical and efficient embodiment of the present invention, it should be well understood that I do not wish to be limited thereto as there might be changes made in the arrangement, disposition, and form of the parts without departing from the principle of the present invention as comprehended within the scope of the appended claims.

What I claim is:

1. In a vehicle mounted on wheels having a brake adapted to act on said wheels, and means for adjusting the action of said brake, an automatic regulating device which comprises, in combination, a frame, two revolving members rotatable in said frame about a common axis and axially slidable with respect to each other, one of said members being of high inertia, transmission means for angularly coupling the other member with said wheels, abutment means, between said two members, for transmitting the rotary motion of said second mentioned member to the first mentioned member, with the possibility, in the case of negative acceleration of said motion, of a relative angular movement of said members about said axis with respect to each other, means for producing an axial sliding of said members with respect to each other in response to said angular relative movement, adjustable elastic means for yieldingly opposing said axial sliding displacement, means for adjusting said elastic means, and means, responsive to said relative sliding displacement of said members, for operating said brake action adjusting means.

2. A regulating device according to claim 1 in which said means for producing an axial relative displacement of said members in response to said angular relative movement include an inclined edge provided on one of said members, and rollers carried by the other member and adapted to run along said edge.

3. A regulating device according to claim 1 in which said adjustable elastic means consist of an adjustable spring.

PAUL HALLOT.